(No Model.)

J. F. S. WALLACE.
FLOWER HOLDER FOR BUTTONHOLES.

No. 516,954. Patented Mar. 20, 1894.

WITNESSES.

INVENTOR.

James F. S. Wallace

ATTORNEY.

THE NATIONAL LITHOGRAPHING COMPANY,
WASHINGTON, D. C.

UNITED STATES PATENT OFFICE.

JAMES F. S. WALLACE, OF CANTON, CHINA.

FLOWER-HOLDER FOR BUTTONHOLES.

SPECIFICATION forming part of Letters Patent No. 516,954, dated March 20, 1894.

Application filed November 27, 1893. Serial No. 492,192. (No model.) Patented in England March 17, 1893, No. 5,805.

*To all whom it may concern:*

Be it known that I, JAMES FREDERICK SHOLTO WALLACE, vice-consul for Sweden and Norway, residing at Canton, China, have invented a new and Improved Flower-Holder for Buttonholes, of which the following is a specification, and for which I have obtained Letters Patent in Great Britain, dated March 17, 1893, No. 5,805.

This invention relates to a new and improved flower holder for button-holes and is so constructed that it will retain the water in which the stems of the flowers are immersed without spilling no matter to what extent it is inclined. Furthermore, the whole of this device is arranged to lie behind the lapel of the coat so as to be quite out of sight, no part protruding through the button-hole.

This device consists of a suitable pouch or pocket of indiarubber or other suitable elastic water-proof material the mouth of which is normally maintained by its own elasticity in a closed position and is arranged to press gently but firmly upon the stems of the flowers inserted therein and to prevent the escape of any of the water in which the stems are immersed. Secured to the upper edge of this device are two hooks having sharp points that will readily take into the fabric of the lapel of the coat so as to suspend the flower holder therefrom. And in order that my invention may be more fully understood and carried into practice I have appended hereunto one sheet of drawings, of which—

Figure 1:
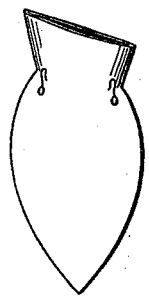
Figure 2:
Figure 3:
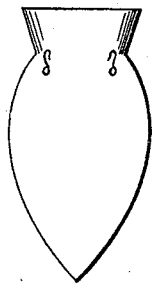
Figure 4:

Figures 1 to 3 are different exterior views of a device constructed according to my invention and Fig. 4 is a vertical section of the same.

As is shown in the drawings the device consists of a suitable pouch or pocket the mouth of which is normally maintained by its own elasticity in a closed position as shown at Fig. 1. The mouth may be opened as at Fig. 2 by a slight pressure applied to the side edges of the device. The mouth is as shown made of less width than the main part of the device so that it may just enter or protrude through the button-hole of the wearer if desired. To the shoulders below the mouth are connected two hooks of suitable design to enter the material of the lapel of the coat and suspend the device.

In the drawings the device is shown as made with a solid bottom so that it may better resist any side pressure brought upon it and so prevent any of the liquid being ejected from its mouth as would be the case were it to yield to such pressure.

What I claim is—

A bouquet holder consisting of a pouch having its opposite sides flattened and brought together at the upper end to form a neck of suitable length, the mouth whereof is normally closed by its own elasticity, substantially as described.

JAMES F. S. WALLACE.

Witnesses:
E. PASQUET,
JAMES CURRAN.